Figure 1:
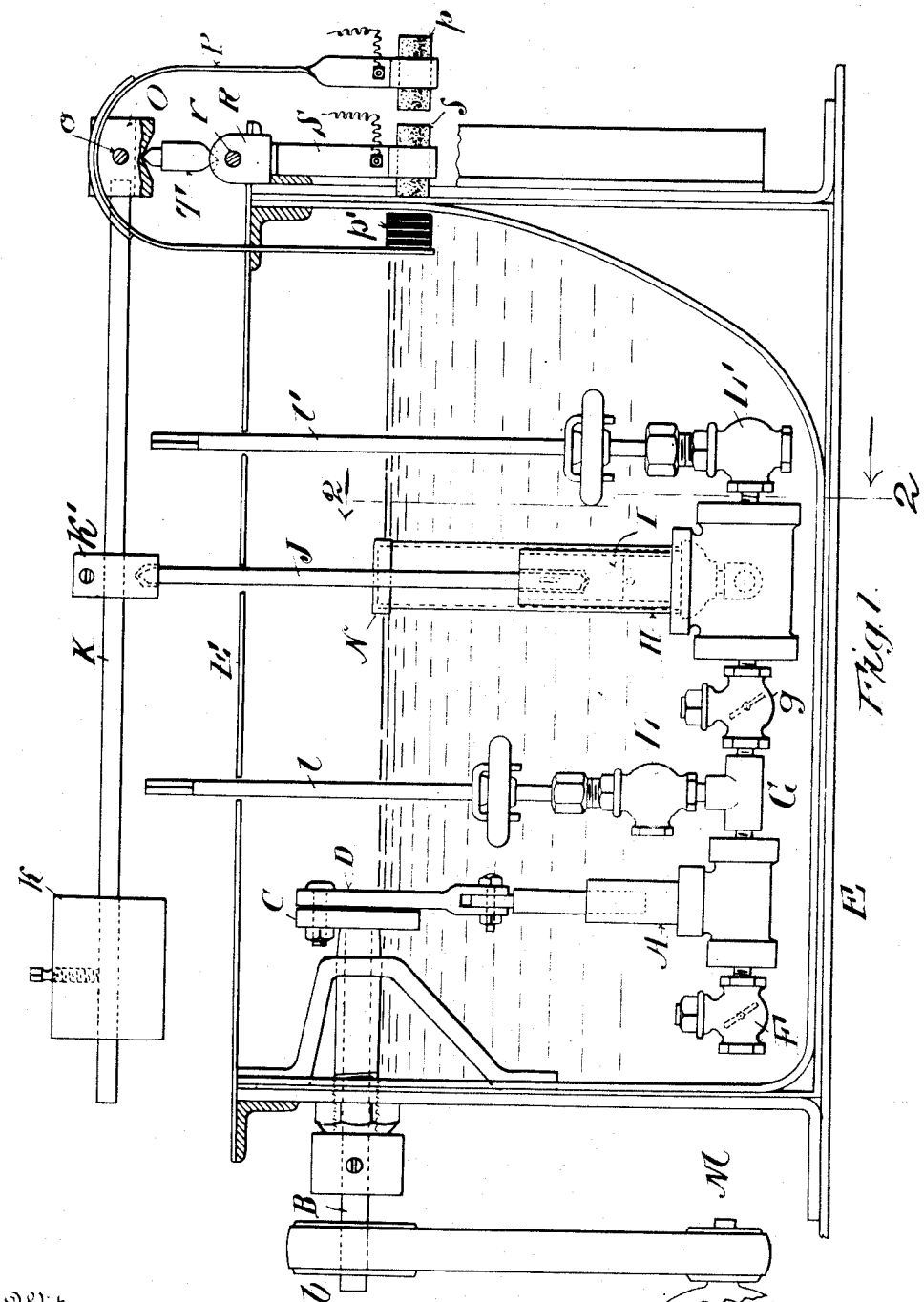

H. W. ROYCE.
CONTROLLING DEVICE.
APPLICATION FILED APR. 9, 1910.

1,023,879.

Patented Apr. 23, 1912.
2 SHEETS—SHEET 1.

Witnesses:
Inventor
Howard W. Royce
By his Attorney
Clarkson A. Collins.

H. W. ROYCE.
CONTROLLING DEVICE.
APPLICATION FILED APR. 9, 1910.
1,023,879.
Patented Apr. 23, 1912.
2 SHEETS—SHEET 2.
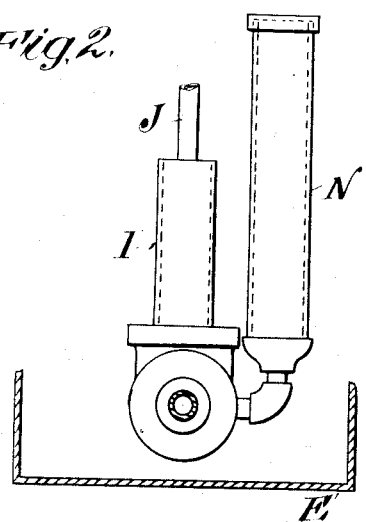
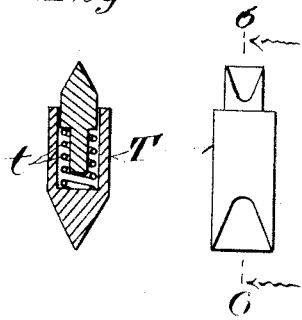
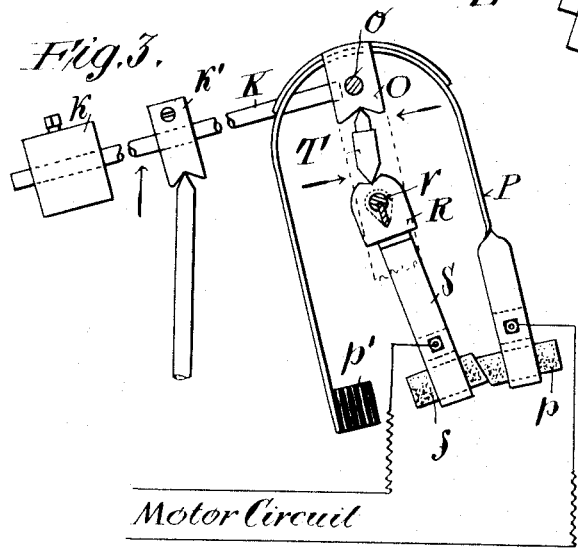
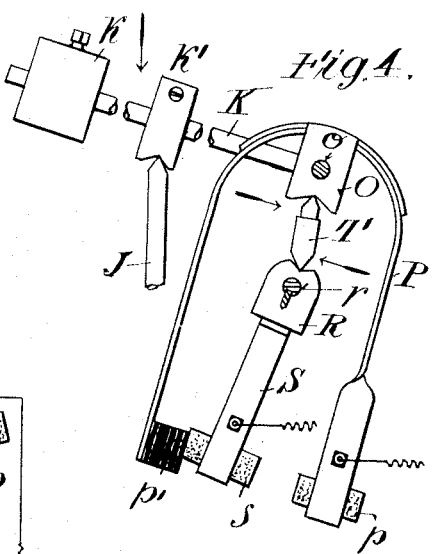
Inventor
Howard W. Royce
By his Attorney
Clarkson A. Collins
Witnesses:

UNITED STATES PATENT OFFICE.

HOWARD W. ROYCE, OF CHICAGO, ILLINOIS, ASSIGNOR TO SEMET-SOLVAY COMPANY, OF SOLVAY, NEW YORK, A CORPORATION OF PENNSYLVANIA.

CONTROLLING DEVICE.

1,023,879.     Specification of Letters Patent.     Patented Apr. 23, 1912.

Application filed April 9, 1910. Serial No. 554,553.

*To all whom it may concern:*

Be it known that I, HOWARD W. ROYCE, a citizen of the United States, residing in the city of Chicago, county of Cook, and State of Illinois, have invented a new and Improved Controlling Device, of which the following is a specification.

In the industrial application of electrically driven motors or machines there are many cases in which it is desirable that the machine or motor shall be intermittent in its action, *i. e.*, shall run, performing its function, for a time and shall then, for a time, cease to operate.

The object of my improvements is to provide a controlling device by means of which such intermittent starting and stopping of any electrically driven apparatus may be automatically effected and which can be so adjusted as to determine at will the length of the periods during which such apparatus shall operate and be at rest.

To this end my invention consists in the combination and arrangement of parts hereinafter shown and described.

The invention will be best understood by reference to the accompanying drawings illustrating an embodiment thereof, Figure 1 of which shows a side elevation of the device, Fig. 2 a sectional end view, Fig. 3 a side elevation of the circuit closing switch with the circuit closed, Fig. 4 a side elevation of the same with the circuit open, Fig. 5 a side elevation on an enlarged scale of a telescopic post, which forms part of the circuit closing device, and Fig. 6 a section of the same on the line 6—6, Fig. 5.

Referring to the drawings, A indicates a pump arranged to be operated through suitable intermediate mechanism, as shaft B, having pulley, $b$, crank C, and connecting rod, D, by the movement of the motor to be controlled indicated at M. The pump A, with the connected parts, is inclosed in a case, E, in which is also contained a quantity of oil, or other suitable liquid, sufficient to supply the pump requirements and, preferably, of such depth as to cover and thereby protect the parts within the case. When the pump is in operation oil is drawn into it through a check valve, F, and forced out of it through a pipe, G, and check valve, $g$, into a cylinder, H, within which is a piston, I, provided with a rod, J, which is in engagement with a pivoted arm, K, carrying a counterweight, $k$.

Between the pump, A, and cylinder, H, is a valve, L, through which some portion of the liquid delivered by the pump, A, will be spilled instead of being delivered into the cylinder, H.

On the other side of the cylinder, H, and connected therewith, is a valve, L', through which the liquid driven into the cylinder, H, by the pump, A, is forced out by the pressure of the piston, I, and connected parts when the pump, A, is not in operation. The valves, L, L', are provided respectively with stems, $l$, $l'$, which extend up through the top of the case, E, whereby the effective orifices of the valves can be adjusted.

Preferably an air chamber, N, is provided, connected with the cylinder, H, to reduce the pulsating effect of a single cylinder pump.

The operation of this portion of the device is as follows: The motor, M, being in operation, the pump, A, forces liquid into the cylinder, H, lifting the piston, I, and arm, K. Some portion of the liquid delivered by the pump, instead of being delivered into the cylinder, H, is spilled out through the valve, L, and the time required to fill the cylinder is determined by the proportion of the entire amount thus spilled, which may be varied by adjusting the effective orifice of the valve, L. When the arm, K, has been lifted to its limit, or to the proper point, a circuit opening device operated thereby opens the motor circuit, and the operation of the pump, A, stops. The piston, I, and arm, K, then descend, the liquid in the cylinder, H, being forced out by the weight of the parts through valve L', until, when the arm, K, has reached a certain point, the motor circuit is closed and the operation is repeated. The rate at which the cylinder, H, is emptied, and hence the length of time the motor remains at rest, is determined by the size of the effective orifice of valve, L', through which the liquid flows out of the cylinder, which can be varied as desired by manipulation of the valve stem, $l'$. In this manner the relative lengths of the periods of operation and rest of the motor, M, can be accurately determined and easily adjusted, the length of the period of operation in any case being the time required to fill the cylinder, H, to a given point, and the length of the period of rest being the time required to empty the cylinder.

Various devices operated by the movement of the piston, I, to open and close the motor circuit, may be employed, and will readily occur to those skilled in the art.

The best form of device for the purpose now known to me, and which I prefer to employ, is as follows: One end of the weighted arm or lever, K, is secured to a hub, O, of insulating material, which is mounted upon a shaft or spindle, o. To the hub, O, is also secured a switch yoke, P, one end of which carries a contact piece, $p$, of carbon or other suitable conducting material, and the other a contact piece, $p'$, of insulating material, as hard rubber, or fiber. Below, and in the same vertical plane with shaft, o, is a spindle, $r$, mounted upon knife-edge bearings, upon which is carried a hub, R, of insulating material. Secured to the hub, R, is a conducting arm, S, provided with a contact piece, $s$, of conducting material, which is located between and adapted to make contact with one or the other of the contacts, $p$, $p'$, upon the yoke, P. As indicated, the yoke, P, and arm, S, are interposed in and make part of the circuit leading to the motor, M. Between the hubs, O, R, is located a telescopic post, T, provided with a compression spring, $t$, and having chisel edge ends which rest in notches in the hubs. By reason of the knife-edge bearings of the spindle, $r$, the hub, R, with arm, S, is in unstable equilibrium, and is always forced over to one side or the other by the action of the spring, $t$, so that the carbon, $s$, is in contact with one or the other of the pieces, $p$, $p'$, and never, except in passing, in the vertical position shown in Fig. 1. When the cylinder, H, is being filled with liquid by the pump, A (the conducting pieces, $p$, $s$, being in contact), the parts move in the directions indicated by the arrows in Fig. 3 until, when the telescopic post, T, has somewhat passed a vertical position, the arm, S, is snapped over, thus separating the contacts, $p$, $s$, and breaking the motor circuit, and the parts assume the position shown in Fig. 4. The motor circuit being broken, the pump A ceases to act. The liquid is then forced out of cylinder, H, by the superincumbent weight causing the parts to move in the directions indicated by the arrows in Fig. 4, until, when the post, T, has again passed the vertical position, the arm, S, is snapped over in the opposite direction, bringing the contacts, $p$, $s$, together, and closing the motor circuit, the parts being in the position shown in Fig. 3. This cycle of operation will continue to be repeated so long as current is supplied to the motor circuit. In case current from the source of supply to the motor circuit is cut off, the parts will remain in the position shown in Fig. 3, ready for the supply of current to the motor when the source of supply is again connected.

From the foregoing it will be clear that my invention may be employed for causing any electrically driven machine to operate intermittently, and that by it the length of the periods during which the machine or motor shall run and be at rest may be accurately determined and adjusted. Thus it may be applied to the control of an electric motor itself employed as a regulator as of temperatures, or of the flow of liquids, or other variable conditions, as by the opening and closing of valves, or dampers, or the movement of other controlling means which are required to move intermittently, the regulator being thus caused to perform its work, as for example, the adjustment of a valve, by successive movements, the extent of which can be accurately predetermined, instead of at a single throw, whereby very exact results can be obtained.

What I claim as new and desire to secure by Letters Patent is:

1. The combination with an electric motor of a circuit opening and closing device, means operable by the movement of the motor to automatically and intermittently open and close the motor circuit thereby, whereby the motor is caused to alternately operate and remain at rest for predetermined periods, and means for varying the absolute and relative lengths of the periods of rest and operation of the motor.

2. In a motor controlling device the combination with a motor of a cylinder, a pump operable by the movement of the motor to be controlled to discharge liquid into the cylinder, a piston within said cylinder, means for controlling and varying the rate of movement of said piston in both directions of travel, and a circuit opening and closing device operable by the movement of said piston to open and close the motor circuit.

3. In a motor controlling device the combination with a motor of a cylinder provided with an opening for the discharge of liquid therefrom, means operated by the motor to be controlled for discharging liquid into said cylinder, and means the frequency of operation of which is determined by the rate of the flow of liquid into and out of said cylinder for intermittently opening and closing the motor circuit.

4. In a motor controlling device the combination with a motor of a cylinder having a piston therein, and provided with an adjustable opening for the discharge of liquid therefrom, a pump operated by the motor to be controlled and arranged to discharge liquid into said cylinder, an adjustable spill valve arranged to permit the waste of a portion of the liquid discharged by the pump toward said cylinder, and a circuit opening and closing device arranged to be operated by the movement of said piston.

5. In a motor controlling device the combination with a motor of a motor circuit, a snap switch interposed in the motor circuit and comprising an unstably mounted contact arm, a rocking member and a telescopic post interposed between said arm and said member, and means operated by the movement of the motor for imparting a reciprocatory movement to said rocking member, whereby the motor circuit is alternately opened and closed.

6. In a motor controlling device the combination with a motor of a motor circuit, a snap switch interposed in the motor circuit and comprising an unstably mounted contact-arm, a rocking member, and a mechanical connection between said arm and said member, and means, operated by the movement of the motor, for imparting a reciprocatory movement to said rocking member, whereby the motor circuit is alternately opened and closed.

In testimony whereof, I have hereunto subscribed my name, this 4th day of April A. D., 1910.

HOWARD W. ROYCE.

Witnesses:
JOHN W. GREENE,
JASPER B. STOUGHTON.